(12) United States Patent
Sakakibara

(10) Patent No.: US 11,833,920 B2
(45) Date of Patent: Dec. 5, 2023

(54) PARKING AID SYSTEM

(71) Applicant: HONDA MOTOR CO., LTD., Tokyo (JP)

(72) Inventor: Naoya Sakakibara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 332 days.

(21) Appl. No.: 17/202,357

(22) Filed: Mar. 16, 2021

(65) Prior Publication Data

US 2021/0291683 A1 Sep. 23, 2021

(30) Foreign Application Priority Data

Mar. 18, 2020 (JP) ................. 2020-047219

(51) Int. Cl.
| | |
|---|---|
| *B60L 53/36* | (2019.01) |
| *H02J 50/90* | (2016.01) |
| *H02J 50/10* | (2016.01) |
| *B60L 53/62* | (2019.01) |
| *B60L 53/122* | (2019.01) |
| *B60L 53/30* | (2019.01) |
| *B60L 53/39* | (2019.01) |
| *H02J 50/80* | (2016.01) |

(52) U.S. Cl.
CPC ............ *B60L 53/36* (2019.02); *B60L 53/122* (2019.02); *B60L 53/305* (2019.02); *B60L 53/39* (2019.02); *B60L 53/62* (2019.02); *H02J 50/10* (2016.02); *H02J 50/80* (2016.02); *H02J 50/90* (2016.02)

(58) Field of Classification Search
CPC ................. H02J 50/90; B60L 53/35
USPC ........................................... 320/108
See application file for complete search history.

(56) References Cited

U.S. PATENT DOCUMENTS

| | | | |
|---|---|---|---|
| 2015/0015084 A1 | 1/2015 | Ichikawa | |
| 2015/0291048 A1* | 10/2015 | Ichikawa | ............... B60L 53/36 701/22 |
| 2017/0126059 A1* | 5/2017 | Takahashi | ............... H02J 50/90 |

FOREIGN PATENT DOCUMENTS

| | | |
|---|---|---|
| JP | 5718879 B2 | 5/2015 |
| JP | 5884890 B2 | 3/2016 |
| WO | 2014068384 A2 | 5/2014 |

* cited by examiner

*Primary Examiner* — Edward Tso
*Assistant Examiner* — Ahmed H Omar
(74) *Attorney, Agent, or Firm* — CKC & Partners Co., LLC

(57) ABSTRACT

A parking aid system aids in alignment parking of a vehicle to a parking space. The vehicle includes: a power receiving unit which receives the electrical power for alignment by way of a power receiving coil; a voltage measuring unit which measures voltage of the power receiving coil; a coil type specifying unit which specifies a type of the power supply coil during the alignment parking; and an alignment aid unit which calculates a target position of the power receiving unit, based on a voltage measured value. The alignment aid unit, in a case of the type of the power supply coil being a DD-type coil, calculates the position of a first peak P1 in the voltage measured value when changing the relative position between the power supply unit and the power receiving unit, and then calculates the target position based on the position of the first peak P1.

5 Claims, 5 Drawing Sheets

PARKING AID SYSTEM

This application is based on and claims the benefit of priority from Japanese Patent Application No. 2020-047219, filed on 18 Mar. 2020, the content of which is incorporated herein by reference.

BACKGROUND OF THE INVENTION

Field of the Invention

The present invention relates to a parking aid system. In more detail, it relates to a parking aid system which aids in alignment parking of a vehicle to a parking space which supplies electrical power for battery charging by non-contact.

Related Art

Conventionally, a configuration has been proposed for electrical vehicles which supplies electrical power for battery charging by non-contact power supply to the vehicle. In the non-contact power supply of such a vehicle, a power supply unit by a power supply coil is provided in the road surface. In addition, a power receiving unit by a power receiving coil is provided at the bottom of the vehicle, and receives electrical power for battery charging sent from the power supply unit by the power receiving unit.

With the non-contact power supply of such a vehicle, it is required to supply electrical power efficiently. For this reason, Patent Document 1 has proposed a scheme which notifies information related to magnetic flux distribution from the power supply unit to the vehicle. In addition, Patent Document 2 has proposed an arrangement which improves efficiency in the power supply by a combination of a cyclic coil and a solenoidal coil.

Patent Document 1: Japanese Patent No. 5884890
Patent Document 2: Japanese Patent No. 5718879

SUMMARY OF THE INVENTION

However, cyclic coils are generally adopted as the power supply coil and power receiving coil. It should be noted that the cyclic coil is formed by a ring shape from winding a magnetic wire so as to go around a winding central axis. In the case of this cyclic coil, it is possible to most efficiently supply power by arranging the power receiving coil relative to the power supply coil so that the central axes of the coils, which are the winding central axes, match. Therefore, in this case, it is necessary to align the power receiving coil so that the center matches with the power supply coil.

However, there are also cases where a DD-type coil is used as the power supply coil. DD-type coil is a coil made by connecting two cyclic coils adjacent in the horizontal direction so that the winding directions are opposite, and is a figure 8 shape in a plan view. In this case, it is possible to efficiently supply power by arranging the power receiving coil at a position displaced from the position where the center of the coil matches the power supply coil. However, conventionally, in the case of a DD-type coil being used as the power supply coil, it has not been sufficiently considered at specifically what position the power receiving unit should be aligned.

The present invention has an object of providing a parking aid system which can align the power receiving unit at the appropriate position, even in the case of a DD-type coil being used as the power supply coil.

A parking aid system (for example, the parking aid system 1 described later) according to a first aspect of the present invention aids in alignment parking of a vehicle (for example, the vehicle 2 described later) to a parking space that supplies electrical power for battery charging by non-contact, in which a power supply unit (for example, the power supply unit 41 described later) which sends electrical power for the alignment from a power supply coil is provided to the parking space; in which the vehicle includes: a power receiving unit (for example, the power receiving unit 11 described later) which receives the electrical power for alignment by way of a power receiving coil; a voltage measuring unit (for example, the voltage measuring unit 14 described later) which measures voltage of the power receiving coil; a coil type specifying unit (for example, the on-board communication device 21 and alignment aid unit 23 described later) which specifies a type of the power supply coil during the alignment parking; and an alignment aid unit (for example, the alignment aid unit 23 described later) which calculates a target position of the power receiving unit during the alignment parking, based on a voltage measured value by the voltage measuring unit, and in which the alignment aid unit, in a case of the type of the power supply coil being a DD-type coil (for example, the DD-type coil LD described later), calculates a peak position (for example, the position of the first peak P1 described later) of the voltage measured value when changing the relative position between the power supply unit and the power receiving unit, and then calculates the target position based on the peak position.

According to a second aspect of the present invention, in this case, it is preferable for the alignment aid unit to display information related to the target position during the alignment parking on a display unit (for example, the display unit 12 described later).

According to a third aspect of the present invention, in this case, it is preferable for a wireless communication device (for example, the wireless communication device 44 described later) which sends identification information identifying the type of the power supply coil to be provided to the parking space, the coil type specifying unit to specify the type of the power supply coil based on identification information sent from the wireless communication device during the alignment parking, and the power receiving coil to be a cyclic coil (for example, the cyclic coil LO described later).

In the parking aid system as described in the first aspect of the present invention, the power supply unit on the side of the parking space sends electrical power for alignment from the power supply coil, the power receiving unit on the side of the vehicle receives the electrical power for alignment by the power receiving coil, the voltage measuring unit measures the voltage of the power receiving coil, the coil type specifying unit specifies the type of power supply coil, and the alignment aid unit calculates the target position of the power receiving unit during alignment parking, based on the voltage measured value. Herein, in the case of the power supply coil being a DD-type coil, it becomes possible to efficiently charge at two positions as explained by referencing FIG. 5 later. In other words, in the case of changing the relative position between the power supply unit and power receiving unit along the horizontal plane, two peaks appear in the voltage measured value. Therefore, the alignment aid unit, in the case of the type of the power supply coil being the DD-type coil, calculates the position of the peak in the voltage measured value when changing the relative position between the power supply unit and power receiving unit, and then calculates the target position of the power receiving unit based on the position of this peak. Therefore, the driver can align the power receiving unit at the appropriate position, even in the case of a DD-type coil being used as the power supply coil, by referencing the target position calculated in this way.

The alignment aid unit of the second aspect of the present invention displays information related to the target position calculated in the aforementioned way during alignment parking on the display unit. The driver can thereby align the power receiving unit at the appropriate position, by referencing information related to the target position displayed on the display unit, during alignment parking.

According to the third aspect of the present invention, there are cases where the type of power supply coil cannot be identified from the external appearance thereof. To address this, the wireless communication device on the side of the parking space sends identification information identifying the type of power supply coil, and the coil type specifying unit on the side of the vehicle specifies the type of power supply coil based on the identification information sent from the side of the parking space during alignment parking. The coil type specifying unit can thereby identify the type of power supply coil, even in a case of not being able to identify the type from the external appearance. In addition, in the present invention, a cyclic coil is used as the power receiving coil. It is thereby possible to align the power receiving unit at the appropriate position, even in the case of using the DD-type coil as the power supply coil, and using the cyclic coil as the power receiving coil.

DETAILED DESCRIPTION OF THE INVENTION

Hereinafter, a parking aid system according to an embodiment of the present invention will be explained while referencing the drawings.

Figure 1:
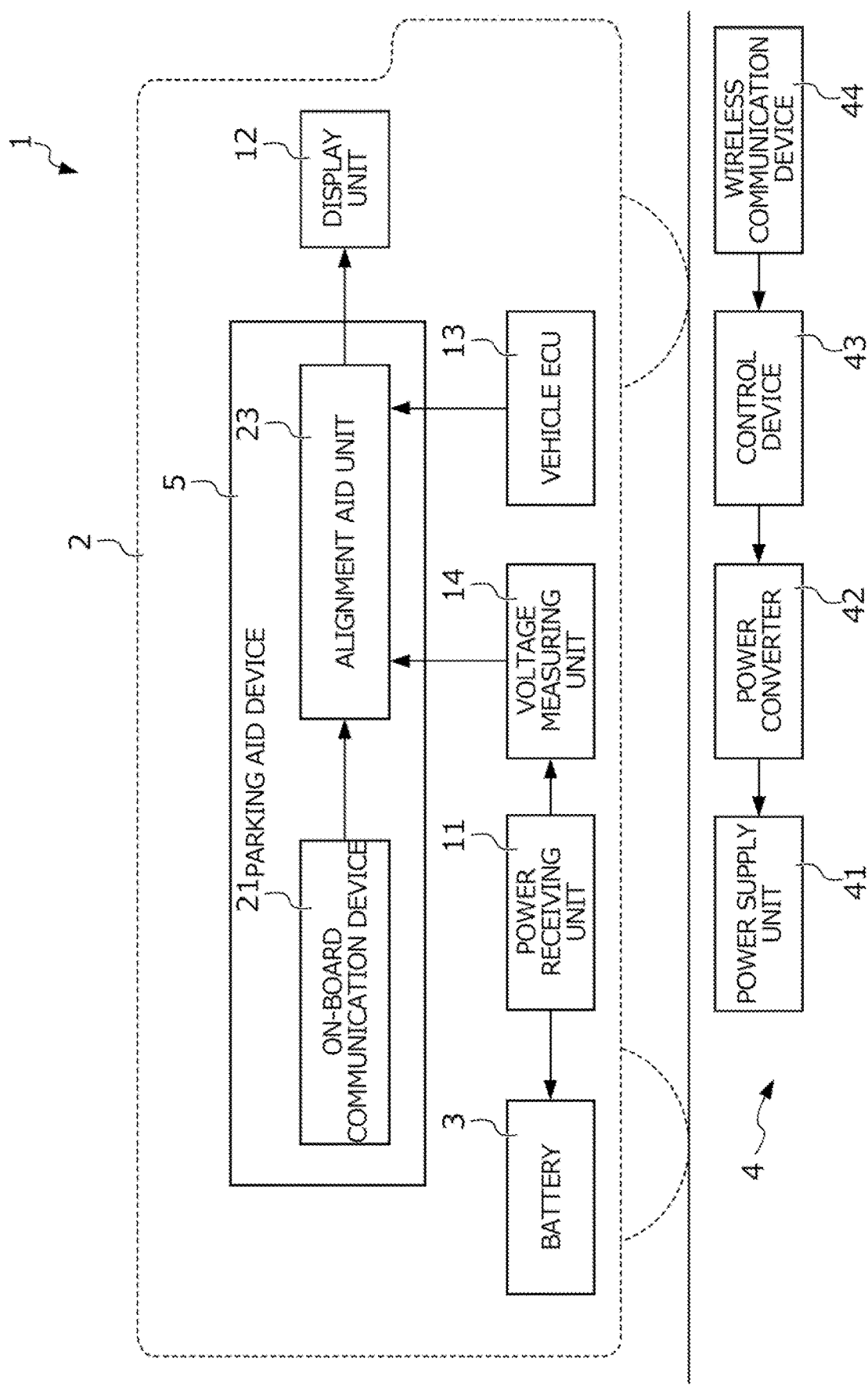
FIG. 1 is a block diagram showing a parking aid system according to an embodiment of the present invention.

FIG. 1 is a block diagram showing a parking aid system 1 according to the present embodiment. The parking aid system 1 aids in parking of a vehicle 2 to a parking space capable of power supply by non-contact power supply.

The vehicle 2 is an electric vehicle which travels by way of the electrical power of a chargeable/dischargeable battery 3. The battery 3 can widely apply secondary batteries, capacitors, etc. capable of charging/discharging electrical power by which the vehicle 2 can travel, such as a lithium-ion secondary battery or nickel hydride secondary battery. A power supply device 4 which supplies charging electrical power of the battery 3 is provided to the parking space.

The parking aid system 1 includes the power supply device 4 provided to the parking space, and the vehicle 2 equipped with a parking aid device 5 described later.

The power supply device 4 includes a power supply unit 41 including a power supply coil which sends electrical power; a power converter 42 which converts alternating current power (not shown) to direct current power and supplies to the power supply unit 41; a control device 43 which operates the power converter 42 to cause electrical power to be sent from the power supply unit 41; and a wireless communication device 44 which performs wireless communication with an on-board communication device 21 equipped to the vehicle 2.

The power supply unit 41 includes the power supply coil installed in the road surface of the parking space. More specifically, the power supply coil is provided at a position facing and close to a power receiving coil provided to the vehicle 2 which has been alignment parked in the parking space. The power supply unit 41 sends direct current power supplied from the power converter 42 from the power supply coil. Herein, a cyclic coil (refer to FIG. 2) or DD-type coil (refer to FIG. 3) can be used as the power supply coil. It should be noted that the present embodiment explains a case of using a DD-type coil as the power supply coil.

Figure 2:
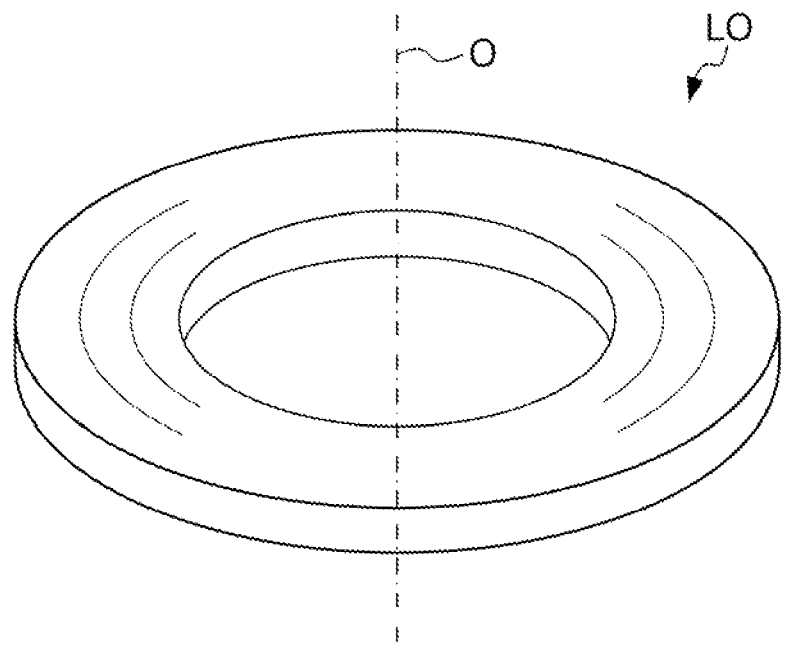
FIG. 2 is a perspective view showing an example of a cyclic coil.

FIG. 2 is a perspective view showing an example of a cyclic coil LO. The cyclic coil LO is formed in an annular shape by winding a magnetic wire so as to go around a winding central axis O, and is an O shape in a plan view. For this reason, the cyclic coil LO is also referred to as O-type coil.

Figure 3:
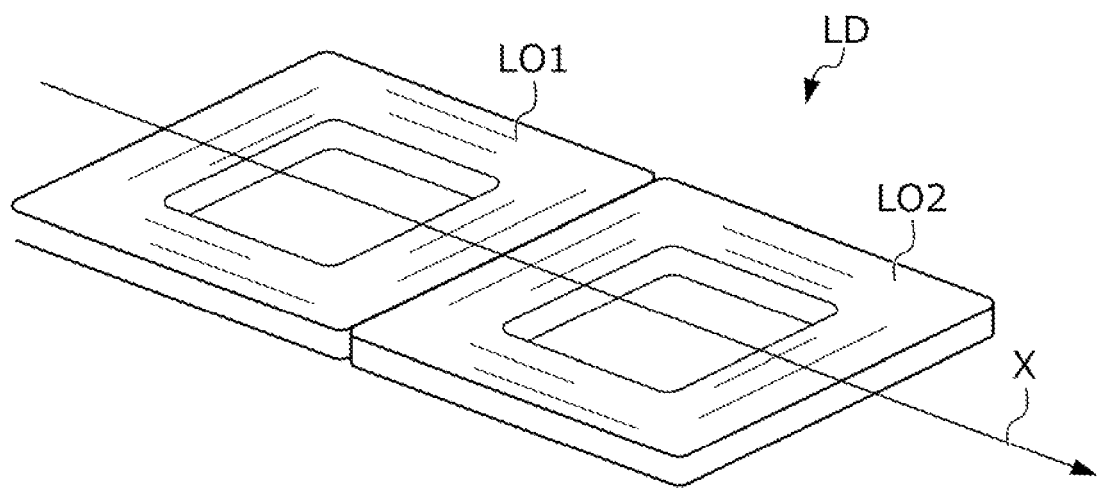
FIG. 3 is a perspective view showing an example of a DD-type coil.

FIG. 3 is a perspective view showing an example of a DD-type coil LD. The DD-type coil LD is a coil made by connecting two cyclic coils LO1, LO2 adjacent in the horizontal direction so that the winding directions are opposite. The DD-type coil LD is a figure 8 shape in a plan view. In addition, the first cyclic coil LO1 and second cyclic coil LO2 are approximately the same shape. In the case of using the DD-type coil LD as the power supply coil, this DD-type coil LD is installed in the road surface of the parking space so that the two cyclic coils LO1, LO2 are adjacent along a traveling direction X of the vehicle in the parking space.

Referring back to FIG. 1, the wireless communication device 44 performs data communication with the on-board communication device 21 existing within a wireless communication range in the vicinity thereof, by way of Wi-Fi (registered trademark), for example. More specifically, the wireless communication device 44 transmits various types of data required in the series of processing with this on-board communication device 21, after executing authentication processing (pairing) with the on-board communication device 21 equipped to a specific vehicle 2 trying to carry out alignment parking. Herein, alignment parking refers to stopping the vehicle 2 within the parking space so that a power receiving unit 11 provided to the vehicle 2 faces the power supply unit 41. In addition, identification information for identifying the type of power supply coil provided in the parking space is included in the data sent from the wireless communication device 44 on the side of the parking space to the on-board communication device 21 on the side of the vehicle 2. For this reason, on the side of the vehicle 2, it is possible to specify whether the type of the power supply coil provided in the parking space in which trying to carrying out alignment parking is a DD-type coil or a cyclic coil.

The control device 43 operates the power converter 42 in response to being paired with the power supply unit 41 through the authentication processing using the wireless communication device 44 during alignment parking, and causes electrical power for alignment to be sent from the power supply coil of the power supply unit 41. In addition, the control device 43 operates the power converter 42 in response to the vehicle 2 being alignment parked in the parking space by causing electrical power for alignment to be sent from the power supply coil of the power supply unit 41, and causes electrical power for charging of the battery 3 to be sent from the power supply coil of the power supply unit 41. Herein, the electrical power for alignment is weaker than the electrical power for charging of the battery 3.

The vehicle 2 includes the battery 3, a parking aid device 5, a power receiving unit 11, a display unit 12, a vehicle ECU 13 which is an onboard computer, and a voltage measuring unit 14.

The power receiving unit 11 charges the battery 3 by receiving the electrical power sent from the power supply unit 41 of the power supply device 4 by non-contact. Herein, in the charging method and charge/discharge control of the battery 3, it is possible to widely adopt various configurations applicable to this type of vehicle 2. The power receiving unit 11 includes a power receiving coil corresponding to the power supply coil of the power supply unit 41, a rectifying circuit which rectifies the output from this power receiving coil, a charge/discharge control circuit of the battery 3, etc. The power receiving coil is arranged at the bottom of the vehicle 2 so as to approach vertically above the power supply coil provided in the parking space, in the vehicle 2 alignment parked. It should be noted that the present embodiment explains a case of using the cyclic coil LO explained by referencing FIG. 2 as the power receiving coil; however, the present invention is not to be limited thereto.

The display unit 12 is a display which presents various information by image display to the driver and other passengers. As the display unit 12, an image display panel such as a liquid crystal display panel and organic EL panel, a heads-up display or the like can be used. Hereinafter, a case of using the display of a car navigation device as the display unit 12 will be explained; however, the present invention is not to be limited thereto.

The vehicle ECU 13 is a controller which presides over control of the vehicle 2. The vehicle ECU 13 outputs, to the parking aid device 5, various information required in the processing of the parking aid device 5 such as a movement distance (travel distance) of the vehicle 2 during alignment parking.

The voltage measuring unit 14 measures the voltage of the power receiving coil. More specifically, the voltage measuring unit 14 measures the voltage of the power receiving coil upon receiving weak electrical power for alignment sent from the power supply coil of the power supply unit 41 as mentioned above by the power receiving coil during alignment parking, and outputs a signal according to the measured value to the parking aid device 5. It should be noted that the voltage measured by the voltage measuring unit 14 upon receiving the weak electrical power for alignment by the power receiving coil is also referred to as LPE (Low Power Excitation) voltage.

Figure 4:
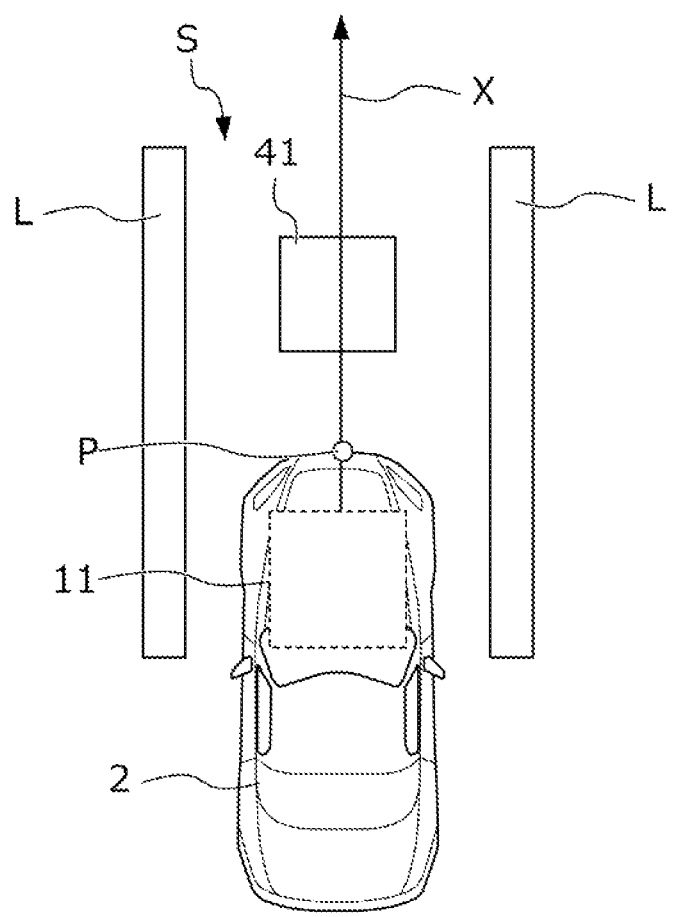
FIG. 4 is a drawing when viewing a vehicle during alignment parking from above.

FIG. 4 is a drawing when viewing the vehicle 2 during alignment parking from above. FIG. 4 illustrates a case of parking the vehicle 2 in a parking space S between two lines L, while advancing along the traveling direction X. The power supply unit 41 including the DD-type coil as the power supply coil as mentioned above is provided in the parking space S. In addition, the power receiving unit 11 including the cyclic coil as the power receiving coil as mentioned above is provided to the vehicle 2. Therefore, during alignment parking, when advancing the vehicle 2 along the traveling direction X as shown in FIG. 4, the relative position along the horizontal direction between the power supply unit 41 and power receiving unit 11 changes.

Figure 5:
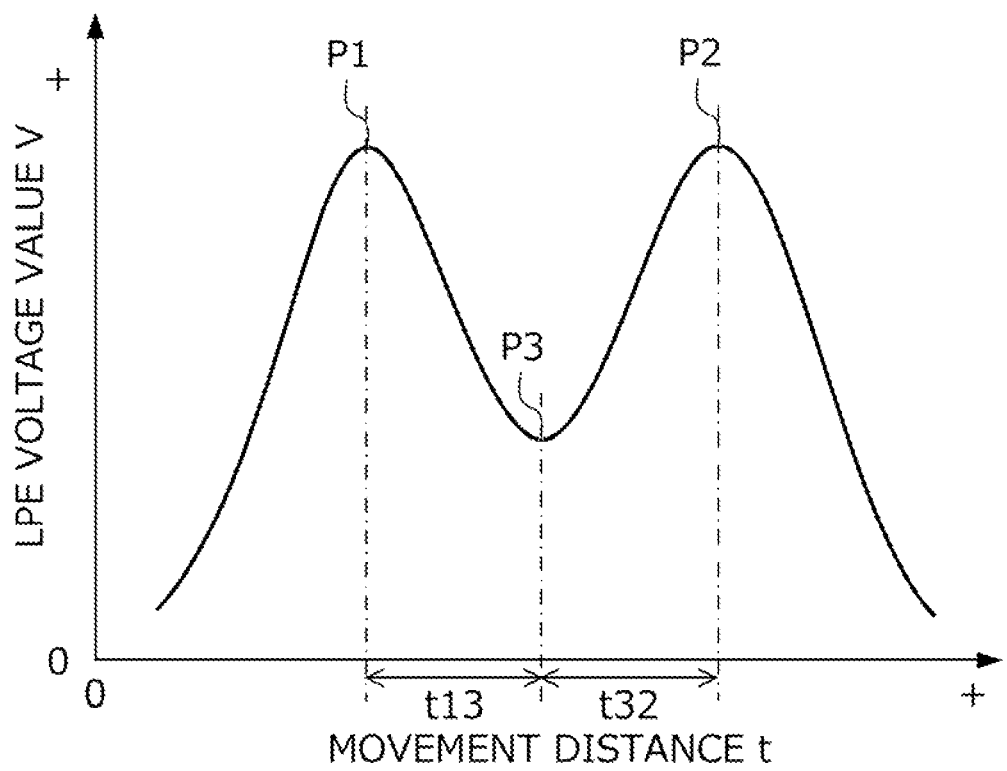
FIG. 5 is a graph showing a characteristic of LPE voltage when changing the relative position between a power supply unit and a power receiving unit.

FIG. 5 is a graph showing the characteristic of LPE voltage when changing the relative position between the power supply unit 41 and power receiving unit 11. More specifically, FIG. 5 is a graph showing the change in LPE voltage when changing the relative position between the power supply unit 41 and power receiving unit 11 by causing the vehicle 2 to advance as shown in FIG. 4, during alignment parking. In FIG. 5, the vertical axis indicates the LPE voltage measured value V measured by the voltage measuring unit 14, and the horizontal axis indicates the movement distance t along the traveling direction X of the vehicle 2 with a predetermined reference position P as the origin.

As explained by referencing FIG. 3, in the case of establishing the power supply coil as the DD-type coil LD, when causing the vehicle 2 to advance along the traveling direction X, the power receiving coil provided to the vehicle 2 sequentially crosses the two cyclic coils LO1, LO2 of the DD-type coil LD. For this reason, when plotting the LPE voltage measured value V when changing the movement distance t with the reference position P as the origin, the two peaks of the first peak P1 and second peak P2, and a minimum point P3 between these two peaks P1, P2 appear, as shown in FIG. 5. The first peak P1 occurs when the power receiving coil and cyclic coil LO1 are facing, and the second peak P2 occurs when the power receiving coil and the cyclic coil LO2 are facing. In addition, the first cyclic coil LO1 and second cyclic coil L2 are approximately the same shape, the heights of the two peaks P1, P2 (voltage wave peak value) are approximately the same. In addition, the waveform of the LPE voltage measured value V is substantially symmetrical about the minimum point P3. For this reason, the distance t13 from the first peak P1 to the minimum point P3 and the distance t32 from the minimum point P3 to the second peak P2 are substantially equal.

In the case of establishing the power supply coil as the DD-type coil and the power receiving coil as the cyclic coil in the above way, since the peaks P1, P2 occur at two different positions, it is possible to charge the battery 3 under a high power supply efficiency at the two different positions of the position of the first peak P1 and the position of the second peak P2.

Referring back to FIG. 1, the parking aid device 5 includes the on-board communication device 21 and alignment aid unit 23, and using these, aids in alignment parking of the vehicle 2 to the parking space in which the power supply device 4 is installed.

The on-board communication device 21 performs data communication with the wireless communication device 44 existing within the wireless communication range in the vicinity thereof, by Wi-Fi (registered trademark), for example. The on-board communication device 21 determines the presence/absence of the wireless communication device 44 within the wireless communication range, by scanning a predetermined frequency band at predetermined cycles. The on-board communication device 21, in the case of the wireless communication device 44 existing within the wireless communication range during alignment parking, starts data communication after performing authentication processing with this wireless communication device 44. In addition, the on-board communication device 21 receives identification information of the power supply coil sent from the wireless communication device 44 during alignment parking, and sends this identification information to the alignment aid unit 23. With the on-board communication device 21 and alignment aid unit 23 on the side of the vehicle 2, it is thereby possible to specify the type of power supply coil provided in the parking space in which trying to park.

The alignment aid unit 23 calculates the target position of the power receiving unit 11 during alignment parking, based on the LPE voltage measured value V measured by the voltage measuring unit 14, the movement distance t of the vehicle 2 sent from the vehicle ECU 13, and the identification information of the power supply coil sent from the on-board communication device 21, and aids in alignment parking by the driver by way of displaying information related to this target position on the display unit 12. A case of the type of power supply coil being the DD-type coil based on the identification information sent from the on-board communication device 21 will be explained hereinafter.

In the case of the type of power supply coil being the DD-type coil, the first peak P1 and second peak P2 will occur as shown in FIG. 5, in the change of the LPE voltage when changing the relative position between the power supply unit 41 and power receiving unit 11. Therefore, the alignment aid unit 23, in the case of specifying that the type of power supply coil is the DD-type coil based on the identification information sent from the wireless communication device 44 during alignment parking, calculates the position of the first peak P1 and position of the minimum point P3 based on the LPE voltage measured value V and the movement distance t, then calculates the position of the second peak P2 based on the position of this first peak P1 and position of the minimum point P3, and defines the position of this second peak P2 as the target position of the power receiving unit 11.

Figure 6:
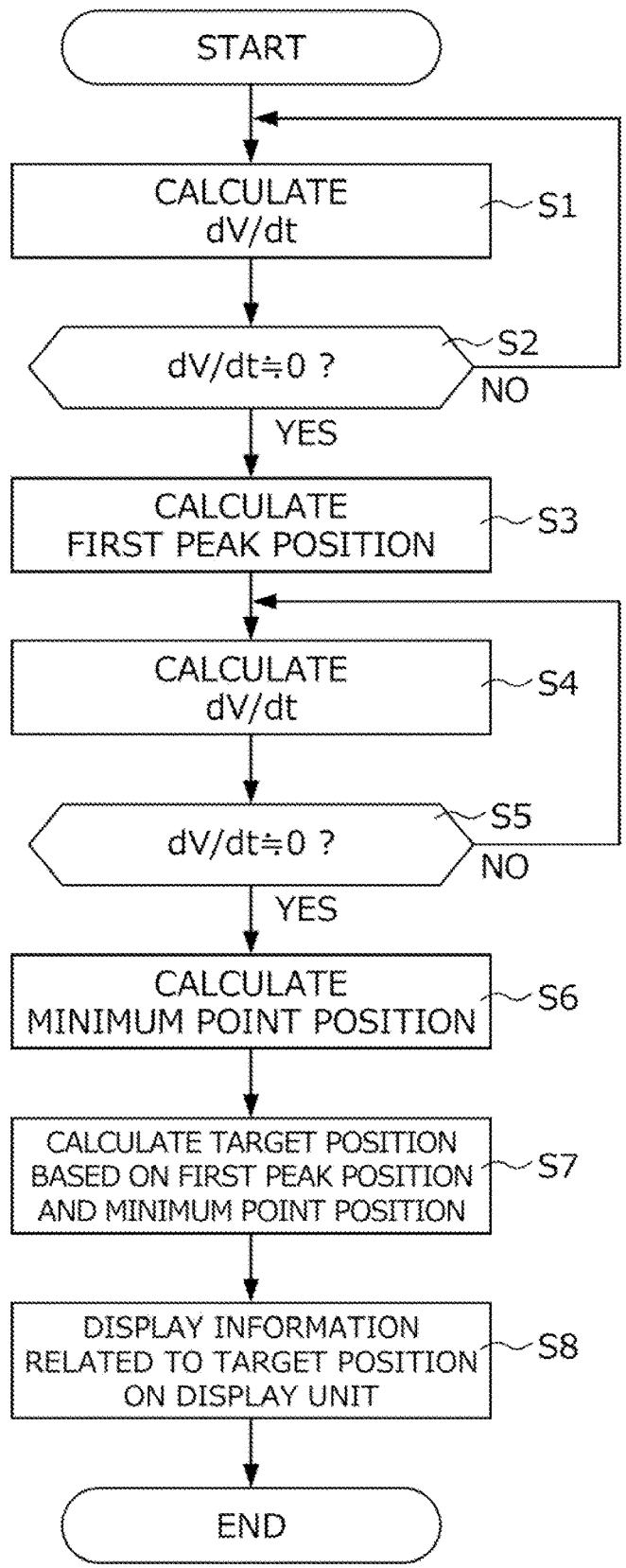
FIG. 6 is a flowchart showing a specific sequence of alignment aid processing in a case of the type of power supply coil being a DD-type coil.

FIG. 6 is a flowchart showing a specific sequence of alignment aid processing by the alignment aid unit 23 in the case of the type of the power supply coil being the DD-type coil. The processing shown in FIG. 6 starts in response to the alignment aid unit 23 specifying that the type of the power supply coil is the DD-type coil, based on the identification information sent from the wireless communication device 44.

First, in step S1, the alignment aid unit 23 calculates a derivative (dV/dt) of the LPE voltage measured value V with respect to the movement distance t. More specifically, the alignment aid unit 23 calculates the derivative (dV/dt) by dividing the minute change (dV) in the LPE voltage measured value V by the minute change (dt) in the movement distance t.

Next, in step S2, the alignment aid unit 23 determines whether the calculated derivative of the LPE voltage measured value V is approximately 0. As shown in FIG. 5, the LPE voltage measured value V increases until the power receiving unit 11 reaches the first peak P1. In other words, at this time, the derivative of the LPE voltage measured value V with respect to the movement distance t becomes positive. In contrast, when the power receiving unit 11 reaches the first peak P1, the derivative of the LPE voltage measured value V becomes approximately 0. The alignment aid unit 23 returns to step S1 in the case of the determination result of step S2 being NO, and advances to step S3 in the case of the determination result of step S2 being YES, i.e. case of the power receiving unit 11 reaching the first peak position P1.

Next, in step S3, the alignment aid unit 23 calculates the position of the first peak P1 (hereinafter also referred to as "first peak position"). This first peak position can be calculated based on the movement distance t when the derivative of the LPE voltage measured value V becomes 0, for example.

Next, in step S4, the alignment aid unit 23 calculates the derivative (dV/dt) of the LPE voltage measured value V with respect to the movement distance t by the same sequence as step S1. Next, in step S5, the alignment aid unit 23 determines whether the calculated derivative of the LPE voltage measured value V is approximately 0. As shown in FIG. 5, when the power receiving unit 11 passes the first peak P1, the LPE voltage measured value V decreases. In other words, at this time, the derivative of the LPE voltage measured value V with respect to the movement distance t becomes negative. In contrast, when the power receiving unit 11 reaches the minimum point P3, the derivative of the LPE voltage measured value V becomes approximately 0 again. The alignment aid unit 23 returns to step S4 in the case of the determination result of step S5 being NO, and advances to step S6 in the case of the determination result of step S5 being YES.

Next, in step S6, the alignment aid unit 23 calculates the position of the minimum point P3 (hereinafter also referred to as "minimum point position"). This minimum point position can be calculated based on the movement distance t when the derivative of the LPE voltage measured value V becomes 0, for example.

Next, in step S7, the alignment aid unit 23 calculates the target position of the power receiving unit 11 based on the first peak position and minimum point position. More specifically, the alignment aid unit 23 calculates the distance along the traveling direction X between the first peak position and minimum point position, as well as calculating the position of the second peak P2 (hereinafter also referred to as "second peak position") by totaling the first peak position with a value arrived at by multiplying the calculated distance by 2, and defines this second peak position as the target position of the power receiving unit 11.

Next, in step S8, the alignment aid unit 23 displays information related to the target position calculated in step S7 on the display unit 12. Herein, the information related to the target position may be displayed in a mode which can be confirmed by the driver on the display unit 12, or may display information relative to displacement between the current position of the power receiving unit 11 and the target position in a mode which can be confirmed by the driver. The driver can thereby align the power receiving unit 11 with the target position, by referencing the information related to the target position displayed on the display unit 12 during alignment parking.

Above, the present embodiment explains a case in which the alignment aid unit 23 calculates the first peak position and minimum point position, and then calculates the target position based on this first peak position and minimum point position; however, the present invention is not to be limited thereto. For example, in the alignment aid unit 23 during alignment parking, in the case of being able to grasp the distance between the first peak position and the second peak position, after calculating the first peak position, the target position may be calculated based on this first peak position. Since it is thereby possible to calculate the target position before calculating the minimum point position during alignment parking, it is possible to display information related to the target position on the display unit 12 at an earlier timing. It should be noted that the distance between the first peak position and second peak position can be grasped in the alignment aid unit 23 together with the identification information of the power supply coil sent from the wireless communication device 44, for example.

According to the parking aid system 1 of the present embodiment, the following effects are exerted.

(1) In the parking aid system 1, the power supply unit 41 on the side of the parking space sends electrical power for alignment from the power supply coil, the power receiving unit 11 on the side of the vehicle 2 receives the electrical power for alignment by the power receiving coil, the voltage measuring unit 14 measures the voltage of the power receiving coil, the on-board communication device 21 specifies the type of power supply coil by acquiring the identification information of the power supply coil, and the alignment aid unit 23 calculates the target position of the power receiving unit 11 during alignment parking, based on the LPE voltage measured value V. Herein, in the case of the power supply coil being the DD-type coil, it becomes possible to efficiently charge at two positions as mentioned above. In other words, in the case of changing the relative position between the power supply unit 41 and power receiving unit 11 along a horizontal plane, the first and second peaks appear in the LPE voltage measured value V. Therefore, the alignment aid unit 23, in the case of the type of the power supply coil being the DD-type coil, calculates the position of the first peak P1 of the LPE voltage measured value V when changing the relative position between the power supply unit 41 and power receiving unit 11, and then calculates the relative position of the power receiving unit 11 based on the position of this first peak P1. Therefore, the driver can align the power receiving unit 11 at the appropriate position, even in the case of the DD-type coil being used as the power supply coil, by referencing the target position calculated in this way.

(2) The alignment parking unit 23 displays information related to the target position calculated in the aforementioned way during alignment parking on the display unit 12. The driver can thereby align the power receiving unit 11 at the appropriate position, by referencing the information related to the target position displayed on the display unit 12, during alignment parking.

(3) There are cases where the type of power supply coil cannot be identified from the external appearance thereof. To address this, the wireless communication device 44 on the side of the parking space sends identification information identifying the type of power supply coil, and the on-board communication device 21 on the side of the vehicle 2 specifies the type of power supply coil based on the identification information sent from the side of the parking space during alignment parking. The on-board communication device 21 can thereby identify the type of power supply coil, even in a case of not being able to identify the type from the external appearance. In addition, in the vehicle 2, a cyclic coil is used as the power receiving coil. It is thereby possible to align the power receiving unit 11 at the appropriate position, even in the case of using the DD-type coil as the power supply coil, and using the cyclic coil as the power receiving coil.

Although an embodiment of the present invention has been explained above, the present invention is not to be limited thereto. The configuration of detailed parts may be appropriately modified within a scope of the gist of the present invention.

What is claimed is:

1. A parking aid system which aids in alignment parking of a vehicle to a parking space that supplies electrical power for battery charging by non-contact,
   wherein a power supply unit which sends electrical power for the alignment from a power supply coil is provided to the parking space,
   wherein the vehicle includes:
   a power receiving unit which receives the electrical power for alignment by way of a power receiving coil;
   a voltage measuring unit which measures voltage of the power receiving coil;
   a coil type specifying unit which specifies a type of the power supply coil during the alignment parking; and
   an alignment aid unit which calculates a target position of the power receiving unit during the alignment parking, based on a voltage measured value by the voltage measuring unit, and
   wherein the alignment aid unit, in a case where the coil type specifying unit specifies a DD-type coil with a figure 8 shape in plan view, calculates a position at which a first time peak appears in the voltage measured value when changing the relative position between the power supply unit and the power receiving unit as a first peak position, and then calculates as the target position a position at which a second time peak appears in the voltage measured value when changing the relative position based on the first peak position.

2. The parking aid system according to claim 1, wherein the alignment aid unit displays information related to the target position during the alignment parking on a display unit.

3. The parking aid system according to claim 1, wherein a wireless communication device which sends identification information identifying the type of the power supply coil is provided to the parking space,
   wherein the coil type specifying unit specifies the type of the power supply coil based on identification information sent from the wireless communication device during the alignment parking, and
   wherein the power receiving coil is a cyclic coil.

4. The parking aid system according to claim 2, wherein a wireless communication device which sends identification information identifying the type of the power supply coil is provided to the parking space,
   wherein the coil type specifying unit specifies the type of the power supply coil based on identification information sent from the wireless communication device during the alignment parking, and
   wherein the power receiving coil is a cyclic coil.

5. The parking aid system according to claim 1, wherein the alignment aid unit calculates a position at which a first time minimum point appears in the voltage measured value when the relative position is changed as a minimum point position, and then calculates the target position based on the first peak position and the minimum point position.

* * * * *